United States Patent
Yiannios et al.

(10) Patent No.: US 9,585,417 B2
(45) Date of Patent: Mar. 7, 2017

(54) DIETARY SUPPLEMENT COMPOSITIONS WITH ENHANCED DELIVERY MATRIX, AND METHODS OF MAKING THE SAME

(71) Applicant: ZEOLIFE INC., Las Vegas, NV (US)

(72) Inventors: James John Yiannios, Las Vegas, NV (US); Subhash Kekatpuray, Central Islip, NY (US)

(73) Assignee: Vitasome Labs, Inc., Placentia, CA (US)

( * ) Notice: Subject to any disclaimer, the term of this patent is extended or adjusted under 35 U.S.C. 154(b) by 15 days.

(21) Appl. No.: 14/132,486

(22) Filed: Dec. 18, 2013

(65) Prior Publication Data
US 2014/0377333 A1    Dec. 25, 2014

Related U.S. Application Data

(60) Provisional application No. 61/837,414, filed on Jun. 20, 2013.

(51) Int. Cl.
*A23L 33/10* (2016.01)
*A23L 1/305* (2006.01)

(52) U.S. Cl.
CPC ............. *A23L 1/3053* (2013.01); *A23L 33/10* (2016.08); *A23L 33/15* (2016.08); *A23V 2002/00* (2013.01)

(58) Field of Classification Search
CPC ...................................................... A61K 9/127
USPC ......................................................... 424/450
See application file for complete search history.

(56) References Cited

U.S. PATENT DOCUMENTS

| | | | | |
|---|---|---|---|---|
| 5,120,561 A * | 6/1992 | Silva | ......... | A21D 2/32 |
| | | | | 426/531 |
| 5,128,139 A * | 7/1992 | Brown | ......... | A61K 8/14 |
| | | | | 424/450 |
| 5,891,465 A * | 4/1999 | Keller | ......... | A61K 9/0043 |
| | | | | 424/43 |
| 7,030,203 B2 | 4/2006 | Mosbey et al. | | |
| 7,300,670 B2 * | 11/2007 | Venus | ......... | A61K 9/0095 |
| | | | | 424/400 |
| 8,026,327 B2 | 9/2011 | Mosbey et al. | | |
| 8,147,869 B2 | 4/2012 | Guilford et al. | | |
| 8,282,977 B2 | 10/2012 | Bromley | | |
| 8,337,931 B2 | 12/2012 | Bromley | | |
| 2003/0109575 A1 * | 6/2003 | Lambert | ......... | A61K 9/0019 |
| | | | | 514/458 |
| 2005/0142124 A1 * | 6/2005 | Kaiser | ......... | A23L 1/3004 |
| | | | | 424/94.1 |
| 2006/0099244 A1 * | 5/2006 | Guilford | ......... | A61K 9/127 |
| | | | | 424/450 |
| 2008/0145502 A1 * | 6/2008 | Vincieri | ......... | A23D 7/0053 |
| | | | | 426/545 |
| 2009/0317532 A1 * | 12/2009 | Bromley | ......... | A23L 1/3004 |
| | | | | 426/590 |
| 2012/0149761 A1 | 6/2012 | Quay | | |
| 2012/0277316 A1 * | 11/2012 | Tillman | ......... | A61K 9/0095 |
| | | | | 514/547 |

OTHER PUBLICATIONS

Glutasome. Glutasome (TM). 2012. [retreived on Oct. 9, 2014]. Retrieved from the Internet <URL:http"www.glutasome.com/>entire document.

Zeolife. An Acute Toxicity Study of Glutasome by Oral Gavage in Rats. pp. 1-59, 2012. [retrieved on Oct. 9, 2014]. Retrieved from the Internet. <URL: http://zeolife.com/newsite/sites/default/files/Summary_Trials.pdf>. p. 43.

Search History: Limited Classification Search, dated Sep. 12, 2014, from corresponding International Patent Application PCT/US2014/043121.

* cited by examiner

*Primary Examiner* — Frederick Krass
*Assistant Examiner* — Amanda Heyes
(74) *Attorney, Agent, or Firm* — Carrier Blackman & Associates, P.C.; William D. Blackman; Fulchand P. Shende

(57) ABSTRACT

A method of making dietary supplement compositions includes generating an aqueous phase, generating an oil phase, performing a first homogenizing step by mixing the aqueous and oil phases, adding reduced glutathione to the aqueous-oil composition and performing a second homogenizing step by mixing the aqueous-oil composition and reduced glutathione, adding a first flavor to the aqueous-oil-glutathione composition, performing a third homogenizing step by mixing the aqueous-oil-glutathione composition and the first flavor, adding xanthan gum dispersed with glycerin to the aqueous-oil-glutathione-first-flavor composition and performing a fourth homogenizing step by mixing the aqueous-oil-glutathione-first-flavor composition and xanthan gum; adding a second flavor to the aqueous-oil-glutathione-first-flavor-xanthan composition and performing a fifth homogenizing step by mixing the aqueous-oil-glutathione-first-flavor-xanthan composition and the second flavor so as to form a dietary supplement composition. Such method provides a dietary supplement as a dispersion including active ingredients incorporated in liposomal vesicles having a barrier coating of polyethylene glycol.

13 Claims, 3 Drawing Sheets

DIETARY SUPPLEMENT COMPOSITIONS WITH ENHANCED DELIVERY MATRIX, AND METHODS OF MAKING THE SAME

CROSS-REFERENCE TO RELATED APPLICATIONS

The present application claims priority under 35 USC 119 based on U.S. Provisional patent application No. 61/837,414, filed on Jun. 20, 2013. The entire subject matter of this priority document, including specification claims and drawings thereof, is incorporated by reference herein.

BACKGROUND OF THE INVENTION

1. Field of the Invention

The present invention relates to dietary supplement compositions with enhanced delivery matrix, and to methods of making the same. More particularly, the present invention relates to dietary supplement compositions in which active ingredients are incorporated in liposomal vesicles having a barrier coating of a polyether, such as polyethylene glycol, and which have prolonged circulatory time in bloodstream of humans and animals when ingested, and to methods of making the same.

2. Description of the Related Art

For decades, the absorption of dietary supplements including vitamins has remained controversial and a matter of considerable investigation. It is generally known that when vitamins and mineral pills, or supplements in liquid or powder forms are ingested, only a fraction of the stated dose on the label of these products is actually absorbed. This purport to be mega-doses of certain vitamins may only be conveying conventional doses, since so much of the product is lost when phagocytes begin attacking the digestive system. The phagocytes cells may perceive supplements to be foreign invaders. In other words, a stated dose of a dietary supplement may have very little bioavailability.

Accordingly, there is a need to make dietary supplements, which will have increased bioavailability.

There are some methods of making dietary supplements. Examples of such methods are illustrated in U.S. Pat. Nos. 8,337,931, 8,282,977, 8,026,327, and 7,030,203, and US Patent Application Publication No. 20120149761, which are briefly discussed further below.

Bromley, U.S. Pat. No. 8,337,931, issued in 2012 and entitled "Compositions containing non-polar compounds", discloses compositions and methods for preparing foods and beverages having additives including nutraceuticals, pharmaceuticals, and supplements, such as essential fatty acids. The method for making the liquid nanoemulsion concentrates includes a water phase and oil phase. In water phase, water phase ingredients are mixed and heated to a low heat temperature, e.g., 60° C. In oil phase, the oil phase ingredients are mixed and heated at a low heat temperature, e.g., 60° C. Subsequently, in an emulsification step, the oil and the water phases are combined by mixing and homogenizing, e.g., using high shear, at low speed between 850 or about 850 rpm and 1200 rpm.

Bromley, U.S. Pat. No. 8,282,977, issued in 2012 and entitled "Compositions containing non-polar compounds", discloses similar compositions and methods as Bromley, U.S. Pat. No. 8,337,931.

Mosbey, et al., U.S. Pat. No. 8,026,327, issued in 2011 and entitled "Water-in-oil emulsions with ethylene oxide groups, compositions, and methods", discloses a method of preparing drug delivery compositions including water-in-oil emulsions. In oil phase, oil phase ingredients are combined and heated at 100° C. for 2 hours. In a separate vessel, water phase ingredients are combined and heated at 100° C. for 15 minutes. The heated water phase is added to the heated oil phase over about 5 minutes. During the addition the contents were mixed with a high-speed homogenizer on three-quarters speed followed by continuous mixing for another 2 minutes at full speed.

Mosbey, et al., U.S. Pat. No. 7,030,203, issued in 2006 and entitled "Water-in-oil emulsions with ethylene oxide groups, compositions, and methods", discloses similar method as Mosbey, et al., U.S. Pat. No. 8,026,327.

Quay, United States Patent Application Publication 20120149761, dated 2012 and entitled "Nucleic Acid Molecules and Uses Thereof", discloses a method of liposomal formulations RNAi molecules. The method includes (a) heating the phospholipid and the organic solvent system to about 60-80° C. in a vessel, dissolving the active ingredient, then adding any additional formulating agents, and stirring the mixture until complete dissolution is obtained; (b) heating the aqueous solution to 90-95° C. in a second vessel and dissolving the preservatives therein, allowing the mixture to cool and then adding the remainder of the auxiliary formulating agents and the remainder of the water, and stirring the mixture until complete dissolution is obtained; thus preparing the aqueous Subcomposition; (c) transferring the organic phase directly into the aqueous Subcomposition, while homogenizing the combination with a high performance mixing apparatus, in particular a high-shear mixer employing 3,000 to about 6,000 rpm; and (d) adding a viscosity enhancing agent to the resulting mixture while further homogenizing.

However, apparently, such known methods of making dietary supplement may not produce dietary supplements compositions with enhanced delivery matrix having increased bioavailability thereof when ingested by or administered to humans and animals.

The present invention has been made to overcome the drawbacks of the existing dietary supplements and methods of making dietary supplements. Accordingly, it is one of the objects of the present invention to provide dietary supplements with enhanced delivery matrix and having increased bioavailability, and methods of making the same. According to the present invention, an example of dietary supplement composition includes ascorbates, reduced Glutathione, and phospholipids, as active ingredients.

SUMMARY OF THE INVENTION

In order to achieve the above objects, the present invention according to one aspect thereof provides a composition of dietary supplement. A dietary supplement has a dispersion including a plurality of liposomal vesicles. The dietary supplement generally includes ascorbates, sodium ascorbate, reduced glutathione, phospholipid which forms the liposomal vesicles, and polyethylene glycol. The ascorbates, sodium ascorbate and reduced glutathione are incorporated in the liposomal vesicles formed of the phospholipid. The liposomal vesicles have a barrier coating of the polyethylene glycol.

Further, the present invention according another aspect thereof provides a method of making the dietary supplement. The method generally includes steps of (1) preparing aqueous phase, (2) preparing oil phase with emulsifier, and (3) mixing the aqueous and oil phases, and performing further steps of including additional ingredients such as flavors, polysaccharides, glycerin, etc.

The method steps for generating/preparing an aqueous phase include:

dissolving potassium sorbate, sodium benzoate, stevia, ethylenediaminetetraacetic acid (EDTA) in 5% w/w of hot purified water at about 55° C., so as to form Subcomposition-I;

dissolving at least one ingredient, e.g., one of sodium ascorbate, reduced glutathione, ascorbic acid, in sufficient amount of hot purified water at a temperature not more than 65° C., so as of form Subcomposition-II;

adding and/or mixing Subcomposition-I to Subcomposition-II, so as to form Subcomposition-III;

adding and/or mixing surfactant/emulsifier (e.g., TWEEN-80) to Subcomposition-III, so as to form Subcomposition-IV;

thereafter, stirring mixture of the surfactant and Subcomposition-IV for a predetermined time period, e.g., for 2 minutes, so as to form Subcomposition-V;

dissolving polyethylene glycol (PEG) in 2% w/w of hot water at not less than 45° C., and adding 50% amount of glycerin to it, and adding hydrogenated glucose syrup/hydrolyzed starch, such as Lycasin, under stirring and mix together well for not more than 10 minutes so as to form Subcomposition-VI; and adding and/or mixing Subcomposition V with Subcomposition-VI, so as to form Subcomposition-VII, i.e., an aqueous phase.

The method steps for preparing an Oil Phase with Emulsifier, i.e., Subcomposition-VIII, include:

mixing phospholipids/phospholipids fraction (e.g., Phosal®35) and tocopherols together under 65° C.; and stirring mix of phospholipids/phospholipids fraction and tocopherols for 2 minutes so as to form a Subcomposition-VIII, i.e., an oil phase.

The method steps for preparing a dietary supplement include:

adding/mixing the aqueous phase (Subcomposition-VII) and the oil phase (Subcomposition-VIII) into in a Stainless Steel vessel;

performing first homogenizing step by mixing the aqueous phase and the oil phase by using a high-shear homogenizer rotated at 1,000 rpm progressively increasing to 5,000 rpm for a first predetermined time period (e.g. 30 minutes), so as to form an aqueous-oil composition (Subcomposition-IX);

adding and/or mixing reduced glutathione (L-glutathione) to the aqueous-oil composition (Subcomposition-IX);

performing second homogenizing by mixing reduced glutathione and aqueous-oil composition by using high shear homogenizer rotated at 1,000 rpm progressively increasing to 5,000 rpm for a second predetermined time period (e.g., not less than 10 minutes) at not more than 65° C., so as to form an aqueous-oil-glutathione composition (Subcomposition-X);

adding first flavor, i.e., an oil phase flavor such as citrus flavor, to the aqueous-oil-glutathione composition;

performing third homogenizing step by mixing aqueous-oil-glutathione composition and the first flavor using the high shear homogenizer rotated at 1,000 rpm progressively increasing to 5,000 rpm for a third predetermined time period (e.g., 3-5 minutes) at not more than 65° C., so as to form an aqueous-oil-glutathione-first-flavor composition (Subcomposition-Xi);

adding polysaccharide, such as Xanthan gum, that is dispersed along with balance quantity of 50% glycerin to aqueous-oil-glutathione-first-flavor composition (Subcomposition-Xi);

performing fourth homogenizing step by mixing the aqueous-oil-glutathione-first-flavor composition and Xanthan gum for a fourth predetermined time period (e.g., 10 minutes) at 1,000 rpm progressively increasing to 5,000 rpm at not more than 65° C., so as to form an aqueous-oil-glutathione-first-flavor-xanthan composition (Subcomposition-XI);

adding a second flavor, i.e., an aqueous phase flavor such as pineapple flavor, watermelon flavor, to the aqueous-oil-glutathione-first-flavor-xanthan composition; and making up the weight to 100% with purified water under constant stirring, i.e., by performing fifth homogenizing step by mixing the aqueous-oil-glutathione-first-flavor-xanthan composition and the second flavor for a fifth predetermined time period (e.g., 3-5 minutes) at 1,000 RPM progressively increasing to 3,500 at not more than 65° C., so as to form an aqueous-oil-glutathione-first-flavor-xanthan-second-flavor composition (Subcomposition-XII); and allowing the flavor to maturate for about 24 hours in the aqueous-oil-glutathione-first-flavor-xanthan-second-flavor composition, so as to form Subcomposition-XIII;

subsequently, nitrogen-flushing a final liquid, i.e. the Subcomposition-XIII, so as to form a final product, i.e., Subcomposition-XIV; and storing the final product, i.e., Subcomposition-XIV, in a well labeled and sealed container.

The present invention according to another aspect thereof is characterized in that the one ingredient is selected from the group of sodium ascorbate, reduced glutathione, and ascorbic acid.

The present invention according to another aspect thereof provides method of making dietary supplement compositions includes method steps of (1) preparing aqueous phase, (2) preparing oil phase with emulsifier, and (3) mixing the aqueous and oil phases. These steps are described below.

The method steps for preparing aqueous phase include:

dissolving potassium sorbate, sodium benzoate, stevia, ethylenediaminetetraacetic acid (EDTA) in 5% w/w of hot purified water at 55° C., so as to form Subcomposition-I;

dissolving a plurality of ingredients (e.g., sodium ascorbate, reduced glutathione, ascorbic acid) in sufficient amount of hot purified water at a temperature not more than 65° C., so as of form Subcomposition-II;

adding and/or mixing Subcomposition-I to Subcomposition-II, so as to form Subcomposition-III;

adding and/or mixing surfactant/emulsifier (e.g., TWEEN-80) to Subcomposition-III, so as to form Subcomposition-IV;

thereafter, stirring mixture of the surfactant, e.g., TWEEN 80 and Subcomposition-IV for a predetermined time period, e.g., for 2 minutes, so as to form Subcomposition-V;

dissolving polyethylene glycol (PEG) in 2% w/w of hot water at not less than 45° C., and adding 50% amount of glycerin to it, and adding Lycasin under stirring and mix together well for not more than 10 minutes so as to form Subcomposition-VI; and adding and/or mixing Subcomposition V with Subcomposition-VI, so as to form Subcomposition-VII.

The method steps for preparing oil phase with emulsifier, i.e., Subcomposition-VIII, include:

mixing phospholipid, e.g., Phosal-35 and mixed tocopherols together under 65° C.; and stirring it for 2 minutes.

The method steps for mixing the aqueous phase and the oil phase includes:

adding Subcomposition-VII and Subcomposition-VIII in a Stainless Steel vessel, and homogenizing at 1,000 rpm progressively increasing to 5,000 rpm for 30 minutes using a high-shear homogenizer, so as to form Subcomposition-IX;

adding and/or mixing reduced glutathione to Subcomposition-IX, and again homogenizing the mixture of reduced glutathione to Subcomposition-IX it for not less than 10 minutes at 1,000 rpm progressively increasing to 5,000 rpm at not more than 65° C., so as to form Subcomposition-X;

adding and homogenizing a first flavor (e.g., oil phase flavor, citrus flavor) with Subcomposition-X so as to form Subcomposition-Xi;

adding Xanthan gum that is dispersed along with balance quantity of about 50% glycerin to Subcomposition-Xi, and homogenizing such final liquid for 10 minutes at 1,000 rpm progressively increasing to 5,000 rpm at not more than 65° C., so as to form Subcomposition-XI; and adding the flavors, such as aqueous phase flavors (e.g., watermelon flavor), to Subcomposition-XI, and making up the weight to 100% with purified water under constant stirring 1,000 rpm progressively increasing to 3,500 rpm at not more than 65° C., so as to form Subcomposition-XII; and allowing the flavor to maturate for 24 hours in Subcomposition-XII, so as to form Subcomposition-XIII;

subsequently, nitrogen-flushing a final liquid, i.e. Subcomposition-XIII, so as to form a final product, i.e., Subcomposition-XIV; and pacing the final product, i.e., Subcomposition-XIV in a well labeled and sealed container.

The present invention according to another aspect thereof is characterized in that the plurality of ingredients is selected from group of sodium ascorbate, reduced glutathione, ascorbic acid.

The present invention according to another aspect thereof is characterized in that the plurality ingredients are sodium ascorbate, reduced glutathione, and ascorbic acid.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

The present invention provides dietary supplement, which may be in a liquid form, with vitamin C, such as sodium ascorbate and ascorbic acid, and reduced glutathione incorporated in a unique matrix that facilitates efficient oral intake and absorption of powerful antioxidants into a human body or an animal body. The sodium ascorbate and ascorbic acid, and reduced glutathione are incorporated, i.e., enclosed in liposomal vesicles of phospholipids. The liposomal vesicles are covered by polyethylene glycol. The polyethylene glycol provides a physical barrier coating to the liposomal vesicles. In other words, the polyethylene glycol acts as or is used as a liner to liposomal vesicles. The vesicle may be of various sizes and shapes. Generally, the liposomal vesicles are about 40-400 μm in diameter. Various flavors, such as oil phase flavors and aqueous phase flavor, may be added to the dietary supplement. Generally, the dietary supplement may include one or more of oil phase flavor such as a citrus flavor, and aqueous phase flavor such as a pineapple flavor, a watermelon flavor. The dietary supplement may also include polysaccharide, such as Xanthan gum, and glycerin. It will be understood that the dietary supplement includes polyethylene glycol, which provides free form, linear coating to the liposomal vesicles. The polyethylene glycol only occupies the space between the liposomes. The polyethylene glycol is not attached to liposome via a covalent bond. In other words, the polyethylene glycol does not form part of the liposome.

The methods of preparing such dietary supplement composition generally include (1) preparing aqueous phase, (2) preparing oil phase with emulsifier, and (3) mixing/homogenizing the aqueous and oil phases. Illustrative embodiments of preparing dietary supplement composition are discussed below.

First Embodiment

Generating an Aqueous Phase

Figure 1:
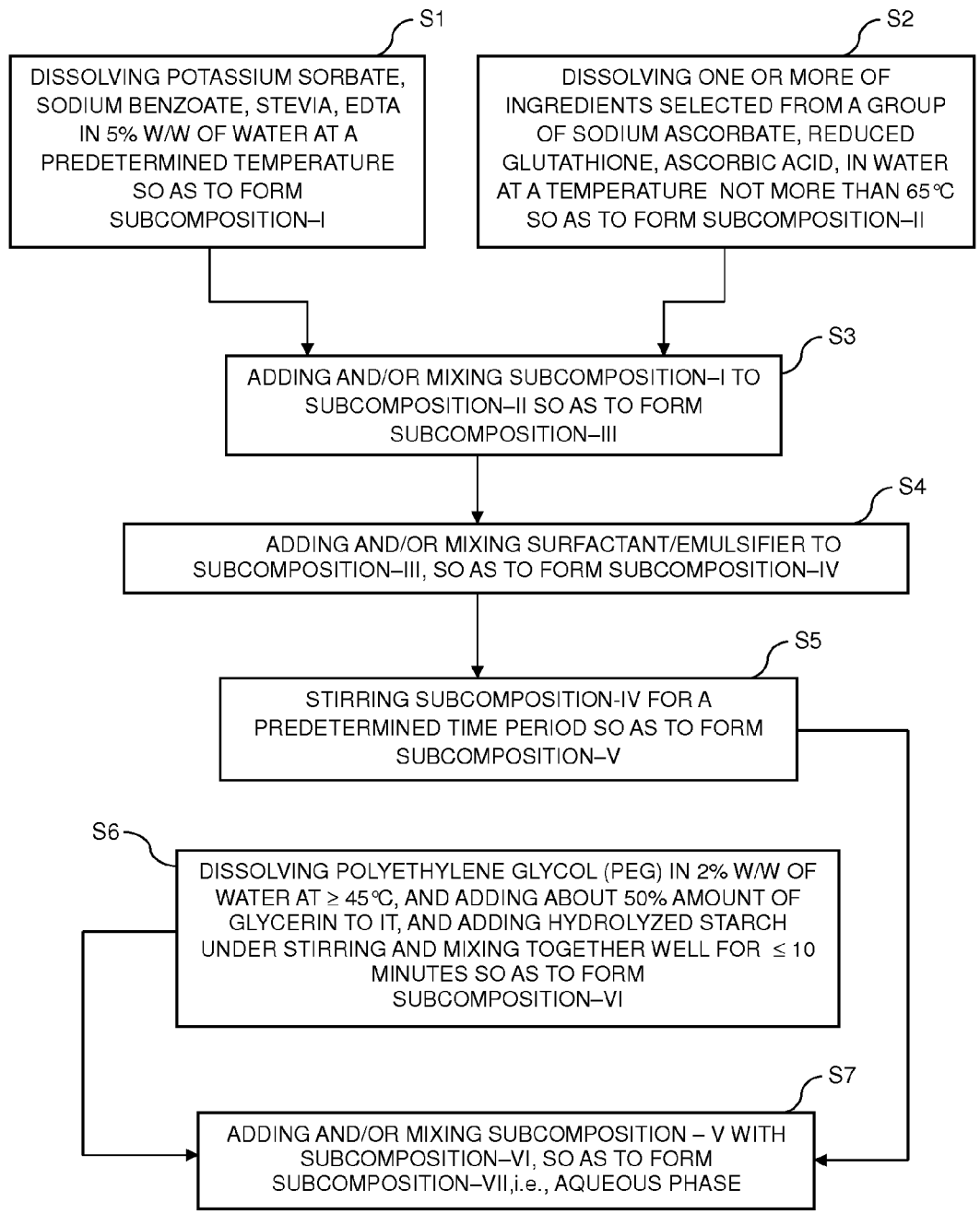
FIG. 1 is a flowchart showing method steps of generating an aqueous phase according to an illustrative embodiment of the present invention.

As shown in FIG. 1, the method steps for generating/preparing an aqueous phase include STEPS S1 through S7. These steps are:

dissolving potassium sorbate, sodium benzoate, Stevia, Ethylenediaminetetraacetic acid (EDTA) in 5% w/w of hot purified water at about 55° C., so as to form Subcomposition-I (STEP S1);

dissolving at least one ingredient, e.g., one of sodium ascorbate, reduced glutathione, ascorbic acid, in sufficient amount of hot purified water at a temperature not more than 65° C., so as of form Subcomposition-II (STEP S2);

adding and/or mixing Subcomposition-I to Subcomposition-II, so as to form Subcomposition-III (STEP S3);

adding and/or mixing surfactant/emulsifier (e.g., TWEEN-80) to Subcomposition-III, so as to form Subcomposition-IV (STEP S4);

thereafter, stirring mixture of the surfactant and Subcomposition-IV for a predetermined time period, e.g., for 2 minutes, so as to form Subcomposition-V (STEP S5);

dissolving polyethylene glycol (PEG) in 2% w/w of hot water at not less than 45° C., and adding 50% amount of glycerin to it, and adding hydrogenated glucose syrup/hydrolyzed starch, such as Lycasin, under stirring and mix together well for not more than 10 minutes so as to form Subcomposition-VI (STEP S6); and adding and/or mixing Subcomposition V with Subcomposition-VI, so as to form Subcomposition-VII, i.e., an aqueous phase (STEP S7).

In this manner, by performing steps S1 through S7, an aqueous phase is generated.

Generating an Oil Phase

Figure 2:
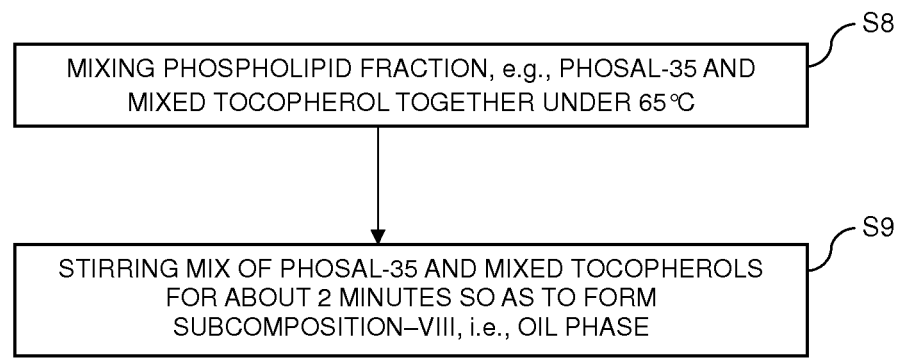
FIG. 2 is a flowchart showing method steps of generating an oil phase.

As shown in FIG. 2, the method steps for generating preparing an Oil Phase with Emulsifier, i.e., Subcomposition-VIII, include:

mixing phospholipids/phospholipids fraction (e.g., Phosal®35) and tocopherols together under 65° C. (STEP S8); and stirring mix of phospholipids/phospholipids fraction and tocopherols for 2 minutes so as to form a Subcomposition-VIII, i.e., an oil phase (STEP S9).

In this manner, by performing steps S8 and S9, an oil phase is generated.

Preparation of Dietary Supplement

Figure 3:
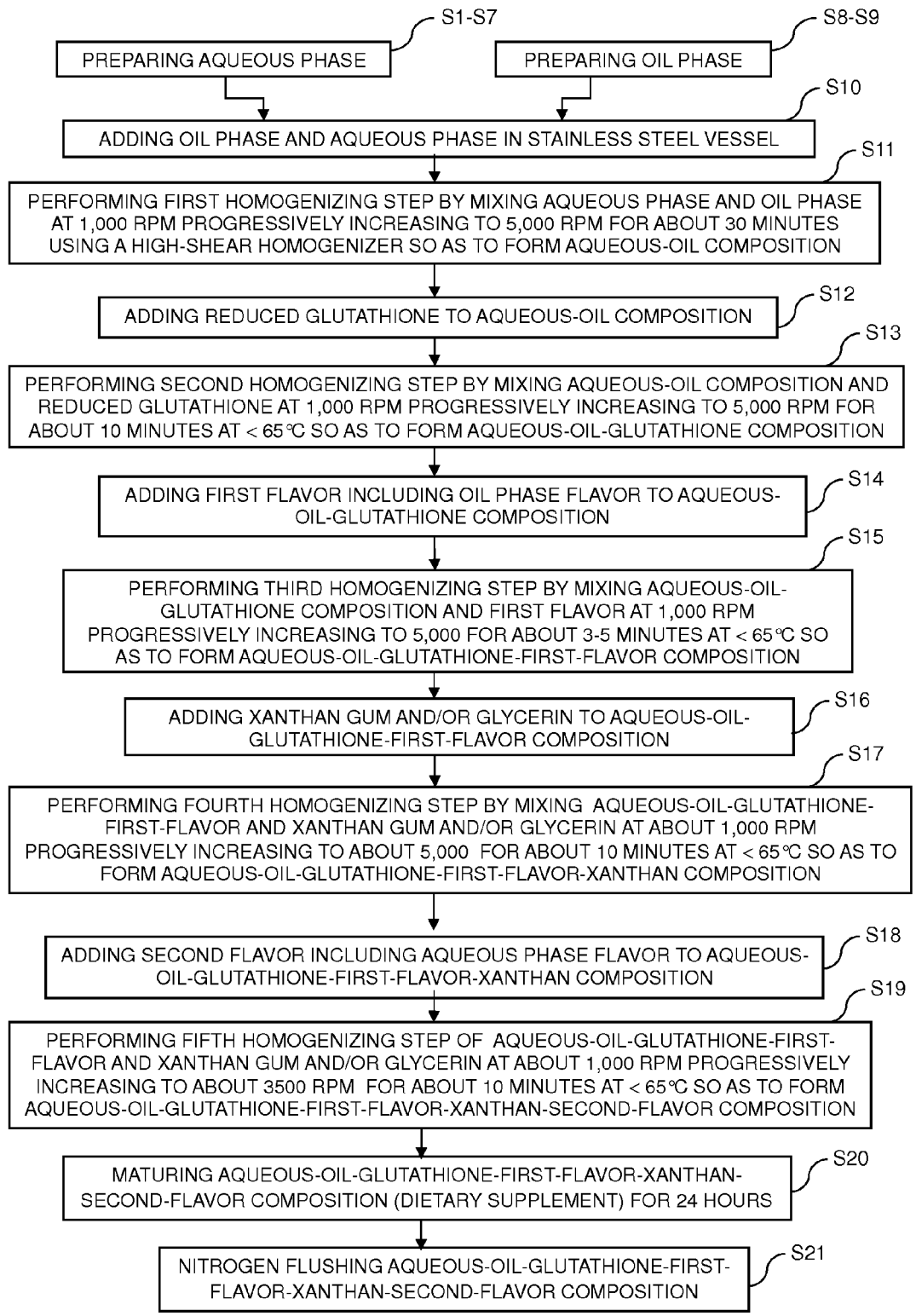
FIG. 3 is flowchart showing steps of preparing a dietary supplement composition.

As shown in FIG. 3, the steps for preparing a dietary supplement include:

adding/mixing the aqueous phase (Subcomposition-VII) and the oil phase (Subcomposition-VIII) into in a Stainless Steel vessel (STEP S10);

performing first homogenizing step by mixing the aqueous and oil phases at 1,000 rpm progressively increasing to 5,000 rpm for a first predetermined time period (e.g. 30 minutes) using a high-shear homogenizer, so as to form an aqueous-oil composition (Subcomposition-IX) (STEP S11);

adding and/or mixing reduced glutathione (L-glutathione) to the aqueous-oil composition (Subcomposition-IX) (STEP S12);

performing second homogenizing step by mixing reduced glutathione and the aqueous-oil composition for a second predetermined time period (e.g., not less than 10 minutes) at 1,000 rpm progressively increasing to 5,000 rpm at not more than 65° C., so as to form an aqueous-oil-glutathione composition (Subcomposition-X) (STEP S13);

adding first flavor including an oil phase flavor to the aqueous-oil-glutathione composition (STEP S14);

performing third step of homogenizing aqueous-oil-glutathione composition and the first flavor for a third predetermined time period (e.g., 3-5 minutes) at 1,000 rpm progressively increasing to 5,000 rpm at not more than 65° C., so as to form an aqueous-oil-glutathione-first-flavor composition (Subcomposition-Xi) (STEP S15);

adding Xanthan gum that is dispersed along with balance quantity of 50% glycerin to aqueous-oil-glutathione-first-flavor composition (Subcomposition-Xi) (STEP S16);

performing fourth step of homogenizing a final liquid, i.e., mixture of aqueous-oil-glutathione-first-flavor composition and Xanthan gum for a fourth predetermined time period (e.g., 10 minutes) at 1,000 rpm progressively increasing to 5,000 rpm at not more than 65° C., so as to form an aqueous-oil-glutathione-first-flavor-xanthan composition (Subcomposition-XI) (STEP S17);

adding a second flavor including an aqueous phase flavor to the aqueous-oil-glutathione-first-flavor-xanthan composition (STEP S18); and making up the weight to 100% with purified water under constant stirring, i.e., by performing fifth step of homogenizing by mixing the aqueous-oil-glutathione-first-flavor-xanthan composition and the second flavor for a fifth predetermined time period (e.g., 3-5 minutes) using the high shear homogenizer rotated at 1,000 rpm progressively increasing to 3,500 rpm at not more than 65° C., so as to form an aqueous-oil-glutathione-first-flavor-xanthan-second-flavor composition (Subcomposition-XII) (STEP S19); and allowing flavors to maturate for 24 hours in the aqueous-oil-glutathione-first-flavor-xanthan-second-flavor composition, so as to form Subcomposition-XIII (STEP S20);

Storage subsequently, nitrogen-flushing a final liquid, i.e. the Subcomposition-XIII, so as to form a final product, i.e., Subcomposition-XIV (STEP S21); and placing/storing the final product, i.e., Subcomposition-XIV, in a well labeled and sealed container.

In this embodiment, the at least one ingredient not limited to the ingredients listed, but could be any nutraceuticals, pharmaceuticals, and any dietary supplemental ingredients.

Second Embodiment

In this embodiment, a plurality of active ingredients— e.g., sodium ascorbate, reduced glutathione, ascorbic acid— is used in generating the aqueous phase. Also, during first through fourth homogenizing steps, the high shear homogenizer may be rotated at speeds between 1000 rpm and 5000 rpm or may be rotated at 1,000 rpm progressively increasing to 5,000 rpm). In the fifth homogenizing step, the high shear homogenizer may be rotated at speed between 1000 rpm and 3500 rpm or may be rotated at 1,000 rpm progressively increasing to 3500 rpm.

Generating an Aqueous Phase

As shown in FIG. 1. the steps for preparing aqueous phase include:

dissolving potassium sorbate, sodium benzoate, stevia, EDTA in 5% w/w of hot purified water at 55° C., so as to form Subcomposition-I (STEP S1);

dissolving a plurality of ingredients (e.g., sodium ascorbate, reduced glutathione, ascorbic acid) in sufficient amount of hot purified water at a temperature not more than 65° C., so as of form Subcomposition-II (STEP S2);

adding and/or mixing Subcomposition-I to Subcomposition-II, so as to form Subcomposition-III (STEP S3);

adding and/or mixing surfactant/emulsifier (e.g., TWEEN-80) to Subcomposition-III, so as to form Subcomposition-IV (STEP S4);

thereafter, stirring mixture of the surfactant, e.g., TWEEN 80 and Subcomposition-IV for a predetermined time period, e.g., for 2 minutes, so as to form Subcomposition-V (STEP S5);

dissolving polyethylene glycol (PEG) in 2% w/w of hot water at not less than 45° C., and adding 50% amount of glycerin to it, and adding hydrolyzed starch (e.g., Lycasin) under stirring and mix together well for not more than 10 minutes so as to form Subcomposition-VI (STEP S6); and adding and/or mixing Subcomposition V with Subcomposition-VI, so as to form Subcomposition-VII, i.e., an aqueous phase (STEP S7).

In this manner, by following steps S1 through S7, as discussed above, an aqueous phase is generated.

Generating an Oil Phase

As shown in FIG. 2, the steps for generating/preparing oil phase with emulsifier, i.e., Subcomposition-VIII, include:

mixing Phosal-35 and mixed tocopherols together under 65° C. (STEP S8); and stirring phospholipids/phospholipids fraction and tocopherols for 2 minutes so as to form a Subcomposition-VIII, i.e., an oil phase (STEP S9).

In this manner, by following steps S8 and S9, an oil phase is generated

Preparing Dietary Supplement

As shown in FIG. 3, steps for mixing the aqueous phase and the oil phase includes:

adding Subcomposition-VII (aqueous phase) and Subcomposition-VIII (oil phase) into in a Stainless Steel vessel, and mixing them by performing first homogenizing step at 1,000 rpm progressively increasing to 5,000 rpm (or at speeds between 1000 rpm and 5000 rpm) for 30 minutes using a high-shear homogenizer, so as to form aqueous-oil composition, (Subcomposition-IX) (STEP S11);

adding and/or mixing reduced glutathione to Subcomposition IX (STEP S12), and again homogenizing the mixture of reduced glutathione to Subcomposition-IX it for not less than 10 minutes at 1,000 rpm progressively increasing to 5,000 rpm (or at speeds between 1000 rpm and 5000 rpm) at not more than 65° C., so as to form aqueous-oil-glutathione composition (Subcomposition-X) (STEP S13);

adding and/or mixing a first flavor, i.e., oil phase flavor (e.g., citrus flavor) to the Subcomposition-X (STEP 14); and again homogenizing the mixture of Subcomposition-IX and the first flavor for about 3-5 minutes at 1,000 rpm progressively increasing to 5,000 rpm (or at speeds between 1000 rpm and 5000 rpm) at not more than 65° C., so as to form aqueous-oil-glutathione-first-flavor composition (Subcomposition-Xi) (STEP S15);

adding Xanthan gum that is dispersed along with balance quantity of 50% glycerin to Subcomposition-Xi (STEP S16); and homogenizing such final liquid for 10 minutes at 1,000 rpm progressively increasing to 5,000 rpm (or at speeds between 1000 rpm and 5000 rpm) at not more than 65° C., so as to form aqueous-oil-glutathione-first-flavor-xanthan composition (Subcomposition-XI) (STEP S17); and adding the second flavor, such as pineapple flavor or any aqueous phase flavor to Subcomposition-XI (STEP 18), and making up the weight to 100% with purified water under constant stirring 1,000 rpm progressively increasing to 3,500 (or at speeds between 1000 rpm and 3500 rpm) at not more than 65° C., so as to form aqueous-oil-glutathione-first-flavor-xanthan-second-flavor composition (Subcomposition-XII) (STEP S19); and allowing the oil phase and aqueous phase flavors to maturate for about 24 hours in Subcomposition-XII, so as to form Subcomposition-XIII (STEP S20);

subsequently, nitrogen-flushing the final liquid, i.e. Subcomposition-XIII, so as to form a final product, i.e., Subcomposition-XIV (STEP S21); and pacing the final product, i.e., Subcomposition-XIV in a well labeled and sealed container.

In this embodiment, the pluralities of ingredients are selected from group of sodium ascorbate, reduced glutathione and ascorbic acid.

Further, in this embodiment, the plurality ingredients are sodium ascorbate, reduced glutathione, and ascorbic acid. However, the plurality of ingredients is not limited to these listed elements, but may include any nutraceuticals, pharmaceuticals, and any dietary supplemental ingredients.

The methods have stand-alone design feature of producing buffered liposomal liquid.

Some Characteristics of Dietary Supplemental Compositions Produced by the Illustrative Methods The methods described in these embodiments produce the dietary supplement formula/compositions having unique deliver matrix and increased bioavailability.

The dietary supplement composition, for example, which includes ascorbates, L-glutathione, and phospholipids as actives ingredient is generally yellow or orange liquid and does not include any artificial sweetener or color. Such dietary composition has: composite dispersion; a viscous gel consistency; a smooth homogenous structure; sweet and sour taste; fruity and characteristic odor; translucent in appearance; a specific gravity between 1.05 and 1.3; a pH range of 4.5 to 5.5; unique formulation design that has polymer covering the dispersed vesicles.

The dietary supplement compositions are suitable for oral administration for humans as dietary supplement. They may suitable for administration for animals. The dispersion of the dietary supplement composition is for improved vitamin C and reduced glutathione absorption including liposomal vesicles in stabilized and coated forms.

The dietary supplement composition may have the active ingredients as follows: between 10% and 14% total ascorbates; between 5% and 5.5% reduced glutathione and between 10% and 12% phospholipids. The amount of said active nutrients or active ingredients is between 22% and 27% by weight of the composition; whereas, the other ingredients are between 73% and 78% by weight of the composition. The dietary composition in a liquid form may include an intimate mixture of the water-soluble and said lipid-soluble nutrients in presence of non-ionic surfactant as emulsifier. The dietary composition includes other ingredients incorporated polyols as Lycasin, glycerin and Xanthan gum as hydrocolloid and polyethylene glycol as protective polymer for vesicle coating. The form of other ingredients incorporated as preservatives, stabilizers, and natural sweeteners.

The dietary supplement composition is a high viscosity product since it is formed by the process comprising mixing and/or homogenization of the composition of water-soluble and lipid-soluble ingredients, for at least 10 minutes at a temperature not exceeding 50° C. so as to emulsify the dispersion uniformly. The dietary supplement composition may be processed and handled under nitrogen-flushed condition throughout the manufacturing process. Also, the dietary supplement composition is packed in unit-serving sachet under nitrogen blanket condition.

The dietary supplement composition is a representative formulation that is composite dispersion of colloid and emulsion. Further, the dietary supplement composition is structurally different from conventional glutathione dosage forms, which are mostly tablets and capsules that have less bioavailability.

More significantly, the dietary supplement composition includes reduced glutathione is a tripeptide with gamma peptide linkage between the amino group of cysteine and carboxyl group of glutamate side chain. The total ascorbates of the dietary supplement composition are sodium ascorbate and ascorbic acid. Reduced glutathione and vitamin C are antioxidants that generally help in resisting the damage to vital cellular subcompositions inflicted by reactive oxygen species as free radicals. The illustrative methods provide the dietary supplements which include phospholipids fraction with typically 35% phosphatidylcholine and other phospholipids in oil based carrier system. Such compound has applications in food and pharmaceuticals.

The dietary supplement according to the present invention has viscosity of 7,000 mPas at 25° C. max., and is an active constituent material of liposome formation. Conventional PEGylation is the process of covalent attachment of polyethylene glycol (PEG) polymer chains to an active molecule. It facilitates attaching the strands of the polymer PEG to peptide fragments that can help to targeted delivery and meet the challenges efficiency of therapeutic compounds. However, it produces alterations in the physico-chemical properties of the active compound, including increase in molecular weight, changes in conformation and hydrophobicity.

These changes increase systemic retention of the active compound in the blood-plasma. However, unpredictability in clearance times for conventionally PEGylated compounds may lead to the accumulation of large molecular weight compounds in the liver leading to inclusion bodies with unknown toxicological consequences. The present invention provides barrier-coating with PEG that overcome drawbacks of the existing PEGylation process. The process/method of producing dietary supplements according to the present invention is different from the conventional PEGylation process as it differs in formulation and process designs.

The illustrated methods generally do not alter or increase the molecular weight of the active compound. The dietary supplements produced by the illustrative method described herein causes barrier-coating (a physical feature) of the active ingredients. In other words, according to the present invention, PEG is used as liners to the liposomes, the product design exemplifies barrier coating of liposome. Applicants of the present invention believe that barrier-coating can advantageously modify the absorption and distribution patterns, and also bioavailability of active compounds. Independent laboratory testing supported these patterns. As discussed earlier, the dietary supplement formulation is processed using high shear homogenization processes.

The present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A method of preparing a dietary supplement, said method comprising the steps of:
    generating an aqueous phase (A1);
      the method step of the generating the aqueous phase comprises
        dissolving potassium sorbate, sodium benzoate, stevia, ethylenediaminetetraacetic acid (EDTA) in 5% w/w of hot purified water at a temperature of about 55° C. based on total weight of the potassium sorbate, the sodium benzoate, the stevia and the EDTA so as to form Subcomposition-I;
        dissolving at least one of a first measurement of reduced glutathione (GSH1), sodium ascorbate and ascorbic acid in hot purified water at a temperature not more than 65° C. so as to form Subcomposition-II;
        adding and mixing said Subcomposition-I to said Subcomposition-II so as to form Subcomposition-III;
        adding and mixing a surfactant to said Subcomposition-III so as to form Subcomposition-IV;
        stirring said Subcomposition-IV for a time period of about 2 minutes, so as to form Subcomposition-V;
        dissolving polyethylene glycol (PEG) in about 2% w/w of hot water at a temperature not less than of 45° C. based on total weight of PEG, and adding about 50% amount of glycerin by weight thereto, and adding one of hydrogenated glucose and hydrolyzed starch under stirring and mixing conditions together for a time period of not more than 10 minutes so as to form Subcomposition-VI; and
        mixing said Subcomposition V and said Subcomposition-VI so as to form said aqueous phase;
    generating an oil phase (O1); said oil phase comprising phospholipid and tocopherol;
    adding said aqueous phase and said oil phase in a vessel;
    performing a first homogenizing step by mixing said aqueous phase and said oil phase using a high shear homogenizer operated at progressively increasing speeds from about 1000 rpm to about 5000 rpm for time period of about 30 minutes so as to form an aqueous-oil (A1/O1) composition having a plurality of liposomal vesicles of said phospholipid, said liposomal vesicles including at least one of said GSH1, sodium ascorbate and ascorbic acid incorporated therein;
    adding a second measurement of reduced glutathione (GSH2) to said A1/O1 composition; and
    performing a second homogenizing step by mixing said A1/O1 composition and said GSH2 using said high shear homogenizer operated at progressively increasing speeds from about 1000 rpm to about 5000 rpm for time period of about 10 minutes so as to form an aqueous-oil-glutathione (A1/O1/GSH2) composition, said A1/O1/GSH2 composition having a physical barrier coating of said PEG linearly formed around said liposomal vesicles without being attached to said liposomal vesicles and without forming part of said liposomal vesicles; wherein said liposomal vesicles are about 40-400 µm in diameter.

2. A method of preparing a dietary supplement according to claim 1, further comprising the steps of
    adding a first oil-phase flavor (F1) ingredient to said A1/O1/GSH2 composition; and
    performing a third homogenizing step by mixing said A1/O1/GSH2 composition and said F1 ingredient by using said high shear homogenizer operated at progressively increasing speeds from about 1000 rpm to about 5000 rpm for a time period about 3-5 minutes so as to form an aqueous-oil-glutathione-first-flavor (A1/O1/GSH2/F1) composition.

3. A method of preparing a dietary supplement according to claim 2, further comprising the steps of
    adding xanthan gum dispersed with glycerin (XG) to said A1/O1/GSH2/F1 composition, wherein said xanthan gum dispersed with glycerin is separate from said glycerin of the aqueous phase; and
    performing a fourth homogenizing step by mixing said A1/O1/GSH2/F1 composition and said XG using said high shear homogenizer operated at progressively increasing speed from 1000 rpm to about 5000 rpm for a time period of about 10 minutes so as to form an aqueous-oil-glutathione-first-flavor-xanthan (A1/O1/GSH2/F1/XG) composition.

4. A method of preparing a dietary supplement according to claim 3, further comprising the steps of
    adding a second aqueous-phase flavor (F2) ingredient to said A1/O1/GSH2/F1/XG composition; and
    performing a fifth homogenizing step by mixing said A1/O1/GSH2/F1/XG and said F2 ingredient by using said high shear homogenizer operated at progressively increasing speeds from 1000 rpm to about 5000 rpm for a time period of about 3-5 minutes so as to form an aqueous-oil-glutathione-first-flavor-xanthan-second-flavor (A1/O1/GSH2/F1/XG/F2) composition;
    wherein said A1/O1/GSH2/F1/XG/F2 composition has viscosity of about 7,000 m·Pas at temperature of about 25° C.

5. A method of preparing a dietary supplement according to claim 4, wherein each of said second through fourth steps of homogenizing are performed at a temperature not more than 65° C.

6. A method of preparing a dietary supplement according to claim 4, wherein said A1/O1/GSH2/F1/XG/F2 composition has a pH between 4.5 and 5.5 and has a specific gravity between 1.05 and 1.30.

7. A method of preparing a dietary supplement according to claim 4, wherein said A1/O1/GSH2/F1/XG/F2 composition comprises between 10% and 15% said at least one of the GSH1, sodium ascorbate and ascorbic acid by weight; between 5% and 5.5% said GSH2 by weight; and between 10% and 12% phospholipid by weight.

8. A method of preparing a dietary supplement according to claim 4, wherein said A1/O1/GSH2/F1/XG/F2 composition includes a combined proportion of GSH2, phospholipid, and said at least one of the GSH1, sodium ascorbate and ascorbic acid between 22% and 27% by weight.

9. A method of preparing a dietary supplement according to claim 4,
    wherein said A1/O1/GSH2/F1/XG/F2 composition includes a combined proportion of said potassium sorbate, sodium benzoate, stevia, EDTA, surfactant, PEG, glycerin, said one of hydrogenated glucose and hydrolyzed starch, and the tocopherol between 73% and 78% by weight.

10. A method of preparing a dietary supplement comprising the steps of:
generating an aqueous phase (A1);
  the method step of the generating the aqueous phase comprises
  dissolving potassium sorbate, sodium benzoate, stevia, ethylenediaminetetraacetic acid (EDTA) in about 5% w/w of purified water at a temperature of about 55° C. based on total weight of the potassium sorbate, the sodium benzoate, the stevia and the EDTA so as to form Subcomposition-I;
  dissolving first measurement of reduced glutathione, sodium ascorbate, ascorbic in sufficient amount of hot purified water at a temperature not more than 65° C. so as of form Subcomposition-II;
  adding and mixing said Subcomposition-I with said Subcomposition-II so as to form Subcomposition-III;
  adding and mixing a surfactant with said Subcomposition-III so as to form Subcomposition-IV;
  stirring said Subcomposition-IV for a time period of about 2 minutes so as to form Subcomposition-V;
  dissolving polyethylene glycol (PEG) in 2% w/w of hot water at a temperature not less than 45° C. based on total weight of PEG, and adding 50% amount of glycerin by weight thereto, and further adding hydrolyzed starch under stirring and mixing conditions for a time period of not more than 10 minutes so as to form Subcomposition-VI; and
  adding and/or mixing said Subcomposition V with said Subcomposition-VI so as to form said aqueous phase;
generating an oil phase (O1) by mixing and stirring phospholipid and tocopherol;
performing a first homogenizing step by mixing said aqueous phase and said oil phase using a high shear homogenizer operated at speeds between 1000 rpm and 5000 rpm for about 30 minutes so as to form an aqueous-oil (A1/O1) composition having a plurality of liposomal vesicles of said phospholipid, said liposomal vesicles including reduced glutathione, sodium ascorbate and ascorbic acid incorporated therein;
adding a second measurement of reduced glutathione (GSH2), which is separate from the GSH1 in the aqueous phase, to said A1/O1 composition; and
performing a second homogenizing step by mixing said A1/O1 composition and GSH2 using said high shear homogenizer operated at speeds between about 2500 rpm and about 5000 rpm for about 10 minutes so as to form an aqueous-oil-glutathione (A1/O1/GSH2) composition, said A1/O1/GSH2 composition having a physical barrier coating of said polyethylene glycol formed in a linear manner around said liposomal vesicles without being attached to said liposomal vesicles and without forming part of said liposomal vesicles;
wherein said liposomal vesicles are about 40-400 μm in diameter.

11. A method of preparing a dietary supplement according to claim 10, further comprising the steps of
  adding a first oil-phase flavor (F1) ingredient to said A1/O1/GSH2 composition; and
  performing a third homogenizing step by mixing said A1/O1/GSH2 composition and said F1 ingredient using said high shear homogenizer operated at speeds between 2500 rpm and 5000 rpm for about 3-5 minutes so as to form an aqueous-oil-glutathione-first-flavor (A1/O1/GSH2/F1) composition.

12. A method of preparing a dietary supplement according to claim 11, further comprising the steps of
  adding xanthan gum dispersed with glycerin (XG) to said A1/O1/GSH2/F1 composition; and
  performing a fourth homogenizing step by mixing said A1/O1/GSH2/F1 composition and XG using said high shear homogenizer operated at speeds between 1000 rpm and 5000 rpm for about 10 minutes so as to form an A1/O1/GSH2/F1/XG composition.

13. A method of preparing a dietary supplement according to claim 12, further comprising the steps of
  adding a second aqueous-phase flavor (F2) ingredient to said A1/O1/GSH2/F1/XG composition; and
  performing a fifth homogenizing step by mixing said A1/O1/GSH2/F1/XG composition and said F2 ingredient using said high shear homogenizer operated at speeds between 1000 rpm to 5000 rpm for a time period of about 3-5 minutes so as to form an aqueous-oil-glutathione-first-flavor-xanthan-second-flavor (A1/O1/GSH2/F1/XG/F2) composition;
wherein said A1/O1/GSH2/F1/XG/F2 composition has viscosity of about 7,000 m·Pas at temperature of about 25° C.

* * * * *